United States Patent
Luo et al.

(10) Patent No.: US 11,148,207 B1
(45) Date of Patent: Oct. 19, 2021

(54) LASER SHOCK PEENING METHOD FOR ADDITIVE MANUFACTURED COMPONENT OF DOUBLE-PHASE TITANIUM ALLOY

(71) Applicant: JIANGSU UNIVERSITY, Zhenjiang (CN)

(72) Inventors: Kaiyu Luo, Zhenjiang (CN); Haifei Lu, Zhenjiang (CN); Jinzhong Lu, Zhenjiang (CN); Xiancheng Zhang, Zhenjiang (CN); Guang Yang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/280,924

(22) PCT Filed: Sep. 18, 2020

(86) PCT No.: PCT/CN2020/116028
§ 371 (c)(1),
(2) Date: Mar. 29, 2021

(87) PCT Pub. No.: WO2021/057606
PCT Pub. Date: Apr. 1, 2021

(30) Foreign Application Priority Data

Sep. 27, 2019 (CN) .......................... 201910923611.6

(51) Int. Cl.
*B22F 10/64* (2021.01)
*B33Y 40/20* (2020.01)
(Continued)

(52) U.S. Cl.
CPC ............. *B22F 10/64* (2021.01); *B22F 10/28* (2021.01); *B22F 10/50* (2021.01); *B33Y 40/20* (2020.01);
(Continued)

(58) Field of Classification Search
CPC .................................. B22F 10/64; B33Y 40/20
(Continued)

(56) References Cited

U.S. PATENT DOCUMENTS

2013/0052479 A1    2/2013   Seetharaman et al.

FOREIGN PATENT DOCUMENTS

| CN | 107414078 A | 12/2017 |
| CN | 109746441 A | 5/2019 |

(Continued)

OTHER PUBLICATIONS

Wei Guo, et al., Laser shock peening of laser additive manufactured Ti6Al4V titanium alloy, Surface & Coatings Technology, 2018, pp. 503-510, vol. 349.

*Primary Examiner* — Weiping Zhu
(74) *Attorney, Agent, or Firm* — Bayramoglu Law Offices LLC

(57) ABSTRACT

A laser shock peening method for an additive manufactured component of a double-phase titanium alloy is provided. First, a three-dimensional digital model of a complex component is obtained, and the model is divided into a plurality of slices; a forming direction of a formed part in an additive manufacturing process is determined according to a stress direction of the additive manufactured component in an engineering application; then, the component of the double-phase titanium alloy is formed and manufactured by selective laser melting, and orientations of a C-axis of an α phase is allowed to be consistent through adjustment and control; and finally, laser shock peening is performed on all outer surfaces of the high-performance additive manufactured component of the double-phase titanium alloy by inducing a high-intensity shock wave to act in an acting direction which forms an angle in a predetermined range with the C-axis of the α phase.

5 Claims, 4 Drawing Sheets

(51) Int. Cl.
   *C21D 10/00* (2006.01)
   *B22F 10/28* (2021.01)
   *B22F 10/50* (2021.01)
   *B33Y 50/00* (2015.01)

(52) U.S. Cl.
   CPC ............ *B33Y 50/00* (2014.12); *C21D 10/005* (2013.01); *B22F 2301/205* (2013.01)

(58) Field of Classification Search
   USPC .......................................................... 419/1
   See application file for complete search history.

(56) References Cited

FOREIGN PATENT DOCUMENTS

| | | |
|---|---|---|
| CN | 109967739 A | 7/2019 |
| CN | 110629014 A | 12/2019 |

LASER SHOCK PEENING METHOD FOR ADDITIVE MANUFACTURED COMPONENT OF DOUBLE-PHASE TITANIUM ALLOY

CROSS REFERENCE TO THE RELATED APPLICATIONS

This application is the national phase entry of International Application No. PCT/CN2020/116028, filed on Sep. 18, 2020, which is based upon and claims priority to Chinese Patent Application No. 201910923611.6, filed on Sep. 27, 2019, the entire contents of which are incorporated herein by reference.

TECHNICAL FIELD

The present invention relates to the fields of additive manufacturing and laser shock peening, and in particular, to a laser shock peening method for an additive manufactured component of a double-phase titanium alloy.

BACKGROUND

Selective laser melting (SLM) technology is a latest rapid forming technology emerging in recent years, which uses layered manufacturing for additive manufacturing, and converts CAD models into physical parts through powders. This technology uses a laser to rapidly melt a metal powder in a selected area, and rapid cooling and solidification, so that a nonequilibrium-state supersaturated solid solution, and a uniform and fine metallographic structure can be obtained, and a wide range of forming materials can be used. Also, the manufacturing process is not limited by the complex structure of metal parts, and does not require any tooling, and has a simple process, to realize rapid manufacturing of the metal parts and the cost reduction. Additionally, the manufacturing of functionally gradient materials with a continuously varying material composition can also be realized. Although great progress has been made in laser additive manufacturing in recent years, some difficulties remain in the coordinated control of structure and performance, among which the "structure control" problem that the residual stress causes deformation and cracking of components and the "performance control" problem that metallurgical defects cause poor mechanical properties of components need to be solved. In addition, the selective laser melting technology has been widely applied in aerospace and other fields. However, components used in aerospace engineering work under harsh conditions, and the components are subjected to not only static load, dynamic load, and impact load but also thermal effect of high temperature in all directions. Thus, the properties of the material and whether the material has a significant anisotropy are issues of great concern.

Laser shock peening (LSP) is a novel surface strengthening technology, which uses an intense laser to act on a metal surface to form ultra-strong shock waves which cause a severe plastic deformation on the metal surface and induce a deep compressive residual stress and refined grains, thereby significantly improving mechanical properties of metal parts. Compared with the other technologies, laser shock peening has four distinctive features of high pressure (the shock wave pressure reaches a magnitude of GPa to TPa), high energy (the peak power reaches a magnitude of GW), ultra-high speed (tens of nanoseconds), and ultra-high strain rate (as high as $10^7$ $s^{-1}$), and becomes one of the advanced manufacturing methods under extreme conditions, and has incomparable advantages over conventional processing methods, and significant technical advantages. However, at present, a large number of researches only focus on the condition of the sample surface subjected to laser shock peening, and the problems of how to induce deeper compressive residual stress, how to better realize grain refinement, and so on.

The double-phase titanium alloy has desirable comprehensive properties, high structural stability, and good toughness, plasticity, and high-temperature deformation properties. Thus, the alloy can be desirably subjected to thermal pressure processing, and can be subjected to quenching and aging to strengthen the alloy. In addition, u and p phases in the double-phase titanium alloy have very important effects on physical and mechanical properties of the material. The crystallography is closely related to various properties of the material, and based on the three-dimensional periodicity of a crystal structure in spatial arrangement, each type of crystal can provide itself with a natural and rational crystal axis system having three crystal axes. The crystal has anisotropy, that is, the crystal has different physical properties in different crystal orientations. In a similar way, combined with the laser shock peening technology of the two-dimensional additive manufacturing plane, high-performance additive manufactured component with uniform strengthening of microstructures can be achieved.

SUMMARY

In order to solve the aforementioned problems, the present invention provides a laser shock peening method for an additive manufactured component of a double-phase titanium alloy. That is, for a high-performance additive manufactured component of a double-phase titanium alloy in aerospace, first, a three-dimensional digital model of a complex component is obtained, and the model is divided into a plurality of slices; a forming direction of a formed part in an additive manufacturing process is determined according to a stress direction of the additive manufactured component in an engineering application; then, the component of the double-phase titanium alloy is formed and manufactured by selective laser melting, and orientations of a C-axis of an α phase are allowed to be consistent through adjustment and control; and finally, laser shock peening is performed on the high-performance additive manufactured component of the double-phase titanium alloy by inducing a high-intensity shock wave to act in an acting direction which forms an angle in a predetermined range with the C-axis of the α phase, so as to achieve an optimal strengthening effect. The present invention is a continuation and expansion of a laser additive manufacturing method. For a key component of the double-phase titanium alloy in aerospace, the anisotropy of a crystal structure is considered, and based on the mechanism of the laser shock peening, the stress state of a high-performance additive manufactured component and the interaction mechanism between a laser shock wave and the C-axis of the α phase of the double-phase titanium alloy are considered as a whole to perform microstructure strengthening of the additive manufactured component, realizing the high-performance manufacturing without deformation of the key component in aerospace.

The specific steps are as follows:

1) obtaining a three-dimensional digital model of a complex component through a computer software, and dividing the model into a plurality of slices;

2) determining a forming direction in an additive manufacturing process according to a stress direction of an additive manufactured component in an engineering application, and then making an additive forming surface parallel to the stress direction;

3) then, forming and manufacturing the component of the double-phase titanium alloy by selective laser melting, and allowing orientations of the C-axis of the α phase to be consistent through continuously applying a strong magnetic field generated by a spiral superconducting coil to a metal melt, wherein an intensity of the strong magnetic field is ≥6 T, wherein parameters of the selective laser melting include: a spot diameter of 80 μm, a laser wavelength of 1.06 to 1.10 μm, a laser power of 200 to 1000 W, a scanning speed of 500 to 1000 mm/s, and a powder layer thickness of 0.02 to 0.5 mm;

4) finally, performing laser shock peening with a normal of the C-axis as a symmetry axis by forming an incident angle, namely, an angle α, between an acting direction of a laser shock wave and the C-axis of the α phase on each of left and right sides, wherein 0°<α<30°; and 5) performing laser shock peening on all outer surfaces of the high-performance additive manufactured component of the double-phase titanium alloy, so as to achieve an optimal strengthening effect, wherein ranges of process parameters of the laser shock peening include: a laser pulse energy of 3 to 12 J, a pulse width of 5 to 20 ns, a spot diameter of 1 to 3 mm, and an overlap ratio in transverse and longitudinal directions each being 30% to 50%.

A material of the high-performance component of the double-phase titanium alloy includes: a near-α titanium alloy such as TC1, TC4, or TC6.

The present invention has the following beneficial effects:

1) The "structure control" problem that the internal stress causes deformation and cracking of the formed part and the "performance control" problem that metallurgical defects cause poor fatigue properties in the additive manufacturing are effectively solved, thereby improving the fatigue strength and mechanical properties of the formed part.

2) Based on microstructure strengthening, movement of basal plane dislocations can be pinned more effectively through the effect of laser shock peening, so that the high-performance additive manufactured component of the double-phase titanium alloy is provided with desirable mechanical properties.

3) For the key component of the double-phase titanium alloy in aerospace, the anisotropy of the crystal structure is considered, and based on the mechanism of the laser shock peening, the stress state of the high-performance additive manufactured component, and the interaction mechanism at the angle in a predetermined range between the acting direction of laser shock wave and the C-axis of the α phase are considered as a whole to perform shock peening on the additive manufactured component of the double-phase titanium alloy, realizing the high-performance manufacturing without deformation of the key component in aerospace.

BRIEF DESCRIPTION OF THE DRAWINGS

In order to illustrate the technical solutions in the embodiments of the present application or in the prior art more clearly, the accompanying drawings to be used in the description of the examples or the prior art will be introduced briefly below.

Figure 1:
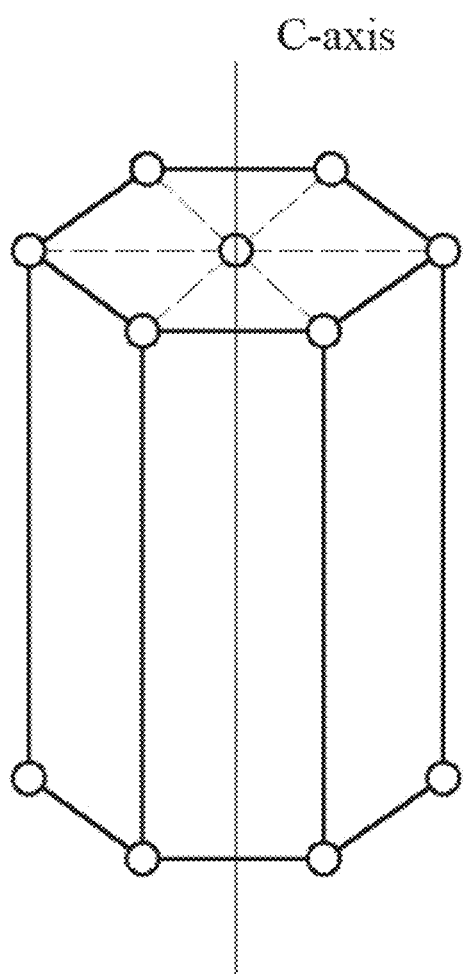
FIG. 1 is a schematic view of a C-axis of an α phase of a double-phase titanium alloy.
Figure 2:
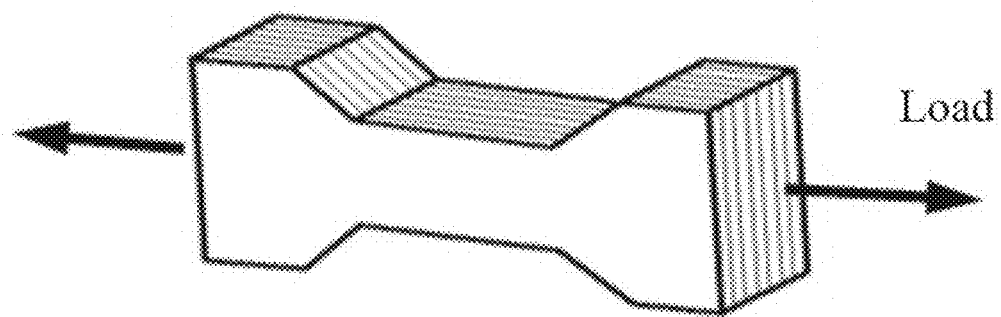
FIG. 2 is a schematic view illustrating that the additive forming surface is parallel to the stress direction in the additive manufacturing process of the present invention.

Table 1 is a comparison of fatigue life of the turbine blades at different states in the embodiments of the present invention.

DETAILED DESCRIPTION OF THE EMBODIMENTS

The specific implementations of the present invention are illustrated in detail below with reference to the accompanying drawings and embodiments, but the present invention should not be limited to the embodiments.

A turbine blade of double-phase TC4 titanium alloy is used in these embodiments.

Embodiment 1

1) Three-dimensional point cloud data on the turbine blade surface is obtained through a three-dimensional laser scanner, and then, a three-dimensional digital model of the turbine blade is obtained through the computer software, and the model is divided into a plurality of slices;

2) simulation analysis is performed through a simulation software to obtain the stress direction distribution of TC4 turbine blade in the actual application, and the additive direction in the additive manufacturing process is determined, so that the additive forming surface is parallel to the stress direction;

3) then, the turbine blade is formed and manufactured by selective laser melting, where parameters of selective laser melting include: a spot diameter of 80 μm, a laser wavelength of 1.08 μm, a laser power of 300 W, a scanning speed of 700 mm/s, and a powder layer thickness of 0.3 mm. A vibration fatigue test is performed on the formed turbine blade.

Embodiment 2

1) Three-dimensional point cloud data on the turbine blade surface is obtained through a three-dimensional laser scanner, and then, a three-dimensional digital model of the turbine blade is obtained through the computer software, and the model is divided into a plurality of slices;

2) simulation analysis is performed through a simulation software to obtain the stress direction of TC4 turbine blade in the actual application, and the additive direction in the additive manufacturing process is determined, so that the additive forming surface is parallel to the stress direction;

3) then, the turbine blade is formed and manufactured by selective laser melting, where parameters of selective laser melting include: a spot diameter of 80 μm, a laser wavelength of 1.08 μm, a laser power of 300 W, a scanning speed of 700 mm/s, and a powder layer thickness of 0.3 mm;

4) finally, laser shock peening is directly performed on the surface of the turbine blade, where ranges of process parameters of laser shock peening include: a laser pulse energy of 10 J, a pulse width of 10 ns, a spot diameter of 3 mm, and an overlap ratio in the transverse and longitudinal directions each being 500%. A vibration fatigue test is performed on the strengthened turbine blade.

Embodiment 3

Figure 3:
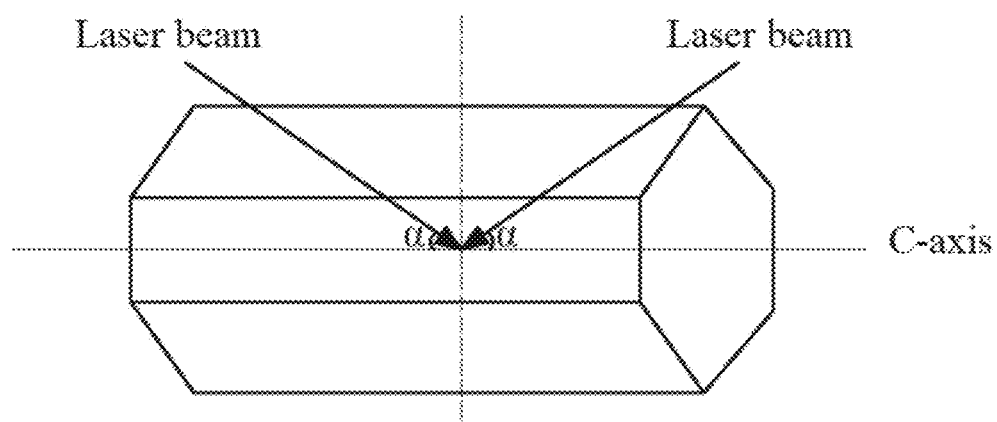
FIG. 3 is a schematic view illustrating that the C-axis of the α phase is subjected to laser shock peening in the present invention.
Figure 4:
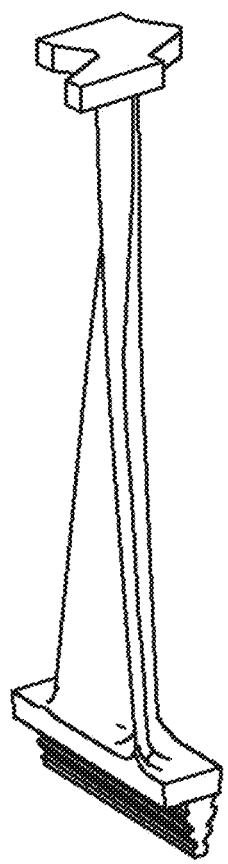
FIG. 4 is a schematic view of the turbine blade in the embodiments of the present invention.

1) Three-dimensional point cloud data on the turbine blade surface is obtained through a three-dimensional laser scanner, and then, a three-dimensional digital model of the turbine blade is obtained through the computer software, and the model is divided into a plurality of slices;

2) simulation analysis is performed through a simulation software to obtain the stress direction of TC4 turbine blade in the actual application, and the additive direction in the additive manufacturing process is determined, so that the additive forming surface is parallel to the stress direction;

3) then, the turbine blade is formed and manufactured by selective laser melting, and the orientations of a C-axis of an α phase is allowed to be consistent through continuously applying a strong magnetic field of 9 T generated by a spiral superconducting coil to a metal melt, where parameters of selective laser melting include: a spot diameter of 80 μm, a laser wavelength of 1.08 μm, a laser power of 300 W, a scanning speed of 700 mm/s, and a powder layer thickness of 0.3 mm;

4) as shown in FIG. 3, finally, laser shock peening is performed with the normal of the C-axis as a symmetry axis by forming an angle α of $30°<\alpha<60°$ or $60°<\alpha<90°$ between the laser shock wave and the C-axis of the α phase on each of left and right sides, where ranges of process parameters of laser shock peening include; a laser pulse energy of 10 J, a pulse width of 10 ns, a spot diameter of 3 mm, and an overlap ratio in the transverse and longitudinal directions each being 50%. A vibration fatigue test is performed on the strengthened turbine blade.

Embodiment 4

The technical solution of the present invention: referring to FIG. 1, FIG. 2, FIG. 3, and FIG. 4, this embodiment relates to a laser shock peening method for additive manufactured component of the double-phase titanium alloy, which includes the following steps:

1) obtaining three-dimensional point cloud data on the turbine blade surface through a three-dimensional laser scanner, and then, obtaining a three-dimensional digital model of the turbine blade through the computer software, and dividing the model into a plurality of slices;

2) performing simulation analysis through a simulation software to obtain the stress direction of TC4 turbine blade in the actual application, and determining the additive direction in the additive manufacturing process, so that the additive forming surface is parallel to the stress direction;

3) then, forming and manufacturing the turbine blade by selective laser melting, and allowing the orientations of the C-axis of the α phase to be consistent through continuously applying a strong magnetic field of 9 T generated by a spiral superconducting coil to a metal melt, where parameters of selective laser melting include: a spot diameter of 80 μm, a laser wavelength of 1.08 μm, a laser power of 300 W, a scanning speed of 700 mm/s, and a powder layer thickness of 0.3 mm;

4) as shown in FIG. 3, finally, performing laser shock peening with the normal of the C-axis as a symmetry axis by forming an angle α of $0°<\alpha\leq30°$ between the laser shock wave and the C-axis of the α phase on each of left and right sides, where ranges of process parameters of laser shock peening include: a laser pulse energy of 10 J, a pulse width of 10 ns, a spot diameter of 3 mm, and an overlap ratio in the transverse and longitudinal directions each being 50%. A vibration fatigue test is performed on the strengthened turbine blade.

It can be seen from Table 1 that in vibration fatigue life tests at four different states of Embodiment 1 (1-1, 1-2), Embodiment 2 (2-1, 2-2), Embodiment 3 (3-1 ($30°<\alpha\leq60°$), 3-2 ($30°<\alpha\leq60°$), 3-3 ($60°<\alpha\leq90°$), 3-4 ($60°<\alpha\leq90°$)), and Embodiment 4 (4-1, 4-2), under different stress conditions of 430 MPa and 560 MPa, the results show that the turbine blade processed using the technical solution of the present invention has significantly improved fatigue life, thereby achieving the optimal strengthening effect.

The above disclosure is merely a preferred embodiment of the present invention, and certainly cannot be used to limit the scope of the present invention. Therefore, equivalent changes made according to the claims of the present invention shall still belong to the scope of the present invention.

TABLE 1

| State | Stress/MPa | Fatigue life |
| --- | --- | --- |
| 1-1 (Embodiment 1) | 430 | $2.49 \times 10^7$ |
| 1-2 (Embodiment 1) | 560 | $1.23 \times 10^7$ |
| 2-1 (Embodiment 2) | 430 | $3 \times 10^7$ |
| 2-2 (Embodiment 2) | 560 | $2.49 \times 10^7$ |
| 3-1 ($30° < \alpha \leq 60°$) (Embodiment 3) | 430 | $3.26 \times 10^7$ |
| 3-2 ($30° < \alpha \leq 60°$) (Embodiment 3) | 560 | $2.86 \times 10^7$ |
| 3-3 ($60° < \alpha \leq 90°$) (Embodiment 3) | 430 | $3.41 \times 10^7$ |
| 3-4 ($60° < \alpha \leq 90°$) (Embodiment 3) | 560 | $2.95 \times 10^7$ |
| 4-1 (Embodiment 4) | 430 | $3.71 \times 10^7$ |
| 4-2 (Embodiment 4) | 560 | $3.38 \times 10^7$ |

What is claimed is:

1. A laser shock peening method for an additive manufactured component of a double-phase titanium alloy comprising the following steps:
   (1) obtaining a three-dimensional digital model of a complex component through a computer software, and dividing the model into a plurality of slices;
   (2) determining a forming direction in the process according to a load direction of the additive manufactured component in an engineering application, and then making an additive forming surface parallel to the load direction;
   (3) then, forming the component of the double-phase titanium alloy by selective laser melting, and allowing the orientations of a C-axis of an α phase to be consistent through continuously applying a strong magnetic field generated by a spiral superconducting coil to a metal melt;
   (4) performing the laser shock peening with a normal of the C-axis as a symmetry axis by forming an incident angle, namely, an angle α, between an acting direction of a laser shock wave and the C-axis of the α phase on each of left and right sides; and
   (5) performing the laser shock peening on all outer surfaces of the additive manufactured component of the double-phase titanium alloy.

2. The laser shock peening method for the additive manufactured component of the double-phase titanium alloy according to claim 1, wherein in step (3), an intensity of the strong magnetic field is ≥6 T, and parameters of the selective laser melting comprise: a spot diameter of 80 μm, a laser wavelength of 1.06 to 1.10 μm, a laser power of 200 to 1000 W, a scanning speed of 500 to 1000 mm/s, and a powder layer thickness of 0.02 to 0.5 mm.

3. The laser shock peening method for the additive manufactured component of the double-phase titanium alloy according to claim 1, wherein in step (4), $0°<\alpha<30°$.

4. The laser shock peening method for the additive manufactured component of the double-phase titanium alloy according to claim 1, wherein in step (5), ranges of process parameters of the laser shock peening comprise: a laser pulse energy of 3 to 12 J, a pulse width of 5 to 20 ns, a spot diameter of 1 to 3 mm, and an overlap ratio in transverse and longitudinal directions each being 30% to 50%.

5. The laser shock peening method for the additive manufactured component of the double-phase titanium alloy according to claim 1, wherein a material of the component of the double-phase titanium alloy comprises a near-α titanium alloy such as TC1, TC4, and TC6.

* * * * *